Figure 1:
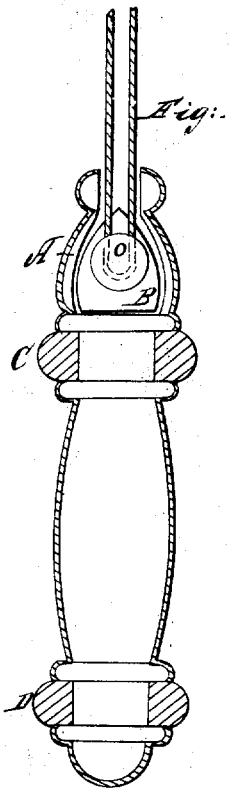
Figure 2:
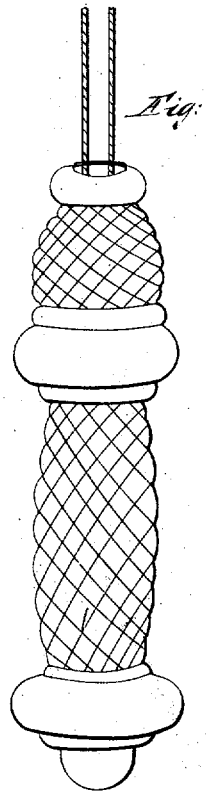
Figure 3:
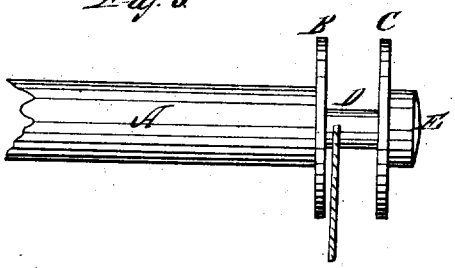
Figure 4:
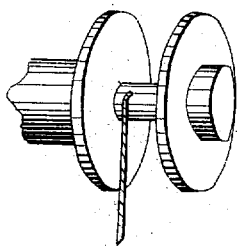

No Printed Specification Available

8968X

H. Lawson,

Curtain Tassel,

Patented July 17, 1835.

N. PETERS, PHOTO-LITHOGRAPHER, WASHINGTON, D. C.

8968 X July 17. 1835 4

Henry Lawson of Boston. Mass.

Letters Patent

The Schedule referred to in these Letters Patent and making part of the same, containing a description in the words of the said Henry Lawson, himself of his improvement in the Machinery for rolling, or winding up window shades, curtains. Maps &c.

To all to whom these presents shall come. Be it known, that I Henry Lawson of Boston, in the County of Suffolk, and State of Massachusetts, have invented a new and useful improvement in the Machinery for winding up window shades, or curtains, Maps &c. and the following is a full and exact description of the construction and opperation of the said Machinery, as invented or improved by me, To one end of the roller A, on which the cloth &c. is wound there is a barrel bounded by two flanches, to which barrel the cord is made fast and wound round as the roller revolves and the cloth runs off the roller.

The diameter of this barrel is made small, that it may take up but little cord as it revolves, and the diameter of the axis is made greater than that of the barrel to aid in checking the force, or velocity of the cloth &c in running off the roller. The cord is then passed through the pendant balance pully B, and carried back to any convenient distance c, and there made fast. The pendant balance pully may be made of any convenient form and must be of sufficient weight to counterpoise the cloth &c. on the roller and so constructed that the cord cannot get off the sheave or sheaves therein. The use of this pendant balance pulley is to keep the cord tight on the barrel and prevent its running

8968X

50.

running over the flanches. To check the cloth &c. as it runs off the roller and to stop it when required also by the manner in which it is suspended to shorten the fall of the slack cord as it runs off the Barrel and enable you to roll up the whole of the cloth &c. at one convenient hands pull. To serve as a handle, a gentle pull at which will wind the whole of the cloth on the roller. when it is required to roll up an excessive length of cloth say above 12 ft. long it will be necessary to have two sheeves in the balance making it a double pulley. My claim is, 1st for reducing the length of the draw (required to roll up this species of roller blind, shade, curtain, map &c. of any required length) to a convenient hands pull that is by one easy move of the hand to cause the roller to revolve sufficiently to wind up any length of cloth &c. required for the above purposes) in the manner as above described. 2nd for the pendent balance pulley and the manner of applying it as above described. 3rd For the relative proportions of the barrel & axis as above described.

Witnesses
Thos. T. Wyman
Patrick Riley

Henry Lawson

500 [illegible]

(Drawing)